(12) United States Patent
Herzog et al.

(10) Patent No.: US 7,964,552 B2
(45) Date of Patent: Jun. 21, 2011

(54) FLUOROSURFACTANT WITH DISPROPORTIONATE EFFECT

(75) Inventors: Axel Hans-Joachim Herzog, West Chester, PA (US); Shaun Raymond Rinehimer, Philadelphia, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 532 days.

(21) Appl. No.: 11/983,858

(22) Filed: Nov. 13, 2007

(65) Prior Publication Data
US 2008/0145329 A1 Jun. 19, 2008

Related U.S. Application Data

(60) Provisional application No. 60/875,106, filed on Dec. 15, 2006.

(51) Int. Cl.
C11D 3/37 (2006.01)
D06M 15/263 (2006.01)
C07C 43/00 (2006.01)
A61K 8/72 (2006.01)

(52) U.S. Cl. ........ 510/466; 568/615; 568/619; 568/676; 568/677; 568/683; 424/70.11; 424/70.12; 424/70.19; 424/70.31; 549/214; 252/8.62

(58) Field of Classification Search .......... 568/615, 568/619, 676, 677, 683; 424/70.11, 70.12, 424/70.19, 70.31; 549/214; 252/8.62; 510/466
See application file for complete search history.

(56) References Cited

U.S. PATENT DOCUMENTS

| | | | |
|---|---|---|---|
| 3,849,315 A | 11/1974 | Chiesa, Jr. | |
| 3,957,657 A | 5/1976 | Chiesa, Jr. | |
| 3,957,658 A | 5/1976 | Chiesa, Jr. et al. | |
| 4,026,845 A | 5/1977 | Kim et al. | |
| 4,038,195 A | 7/1977 | Chiesa, Jr. | |
| 4,060,489 A | 11/1977 | Chiesa, Jr. | |
| 4,387,032 A | 6/1983 | Chiesa, Jr. | |

(Continued)

FOREIGN PATENT DOCUMENTS

EP 0 008 209 A1 2/1980

(Continued)

OTHER PUBLICATIONS

Bascom et al., Wetting of low-energy surfaces by nonaqueous solutions or dimethylsiloxane-containing or fluorocarbon-containing surfactants, Industrial & Engineering Chemistry Product Research and Development (1969), 8(2), 118-123, USA.

(Continued)

*Primary Examiner* — Mark Eashoo
*Assistant Examiner* — Jane L Stanley
(74) *Attorney, Agent, or Firm* — Livia Boyadjian (57) ABSTRACT

This invention relates to surfactant compositions comprising a fluorosurfactant and a siloxane surfactant wherein the fluorosurfactant exhibits a disproportionate effect upon the resulting surfactant composition's ability to lower equilibrium surface tension. The fluorosurfactants and siloxane surfactants identified by the present invention exhibit a desirable disproportionate effect from the fluorosurfactant acting upon the resulting surfactant composition's ability to lower equilibrium surface tension. Because of this disproportionate effect, surfactant compositions of the present invention with no more than 21 weight percent fluorosurfactant have nearly identical ability to lower equilibrium surface tensions compared with surfactant compositions having higher amounts of fluorosurfactant. Such a disproportionate effect is desirable because it permits the use of lower amounts of the more costly fluorosurfactant and higher amounts of the less costly siloxane without significantly deteriorating equilibrium surface tension.

9 Claims, 3 Drawing Sheets

U.S. PATENT DOCUMENTS

| | | | |
|---|---|---|---|
| 4,460,791 A | | 7/1984 | Cooke |
| 4,511,489 A | | 4/1985 | Requejo et al. |
| 4,625,010 A | | 11/1986 | Huhn et al. |
| 5,470,904 A | * | 11/1995 | Loftin et al. .................. 524/462 |
| 5,558,806 A | | 9/1996 | Policello et al. |
| 5,603,776 A | | 2/1997 | Lentsch et al. |
| 5,759,980 A | * | 6/1998 | Russo et al. .................. 510/241 |
| 5,804,625 A | * | 9/1998 | Temperante et al. ......... 524/188 |
| 5,852,075 A | * | 12/1998 | Held ............................ 523/161 |
| 6,090,765 A | | 7/2000 | Black et al. |
| 6,113,679 A | | 9/2000 | Adkins et al. |
| 6,156,860 A | | 12/2000 | Tanaka et al. |
| 6,503,413 B2 | | 1/2003 | Uchiyama et al. |
| 6,506,806 B2 | | 1/2003 | Taylor et al. |
| 6,515,069 B1 | | 2/2003 | Gervasi et al. |
| 6,521,084 B1 | * | 2/2003 | Burger et al. .................. 162/72 |
| 6,524,494 B2 | * | 2/2003 | Hart et al. .................... 252/8.91 |
| 6,764,616 B1 | | 7/2004 | Beisele et al. |
| 7,037,440 B2 | | 5/2006 | Chrobaczek et al. |
| 2003/0113555 A1 | | 6/2003 | Pellerite et al. |
| 2003/0136938 A1 | | 7/2003 | Clark et al. |
| 2003/0149218 A1 | | 8/2003 | Cote' et al. |
| 2004/0106696 A1 | | 6/2004 | Ma et al. |
| 2004/0170933 A1 | | 9/2004 | Moon et al. |
| 2004/0255395 A1 | * | 12/2004 | Zhang et al. .................... 8/159 |
| 2005/0229327 A1 | | 10/2005 | Casella et al. |
| 2005/0250668 A1 | * | 11/2005 | Serobian et al. ............... 510/466 |
| 2007/0141007 A1 | * | 6/2007 | Glynn et al. ................ 424/70.11 |

FOREIGN PATENT DOCUMENTS

| | | |
|---|---|---|
| EP | 0 839 876 A1 | 10/1997 |
| EP | 1 136 515 B1 | 3/2001 |
| GB | 1381953 | 1/1975 |
| GB | 2 200 365 A | 8/1988 |
| JP | 54000056 | 1/1979 |
| JP | 03030825 | 2/1991 |
| JP | 1999323255 A | 11/1999 |
| JP | 2004272161 A | 9/2004 |
| JP | 2004275991 A | 10/2004 |
| JP | 2004322486 | 11/2004 |
| JP | 2004346181 | 12/2004 |
| JP | 2006139264 | 6/2006 |

OTHER PUBLICATIONS

Kobayashi et al., Nonionic Fluorosilicone Surfactants, J. of Colloid and Interface Sciene (1993), 156, 415-419, Academic Press, Inc., USA.

Owen et al., Surface active fluorosiloxanes, Surface Coatings International (1995), 78(2), 52-54, 56-57. Abstract.

Baquerizo at al., Measurement of dynamic surface tension to determine critical micellar concentration in lipophillic silicone surfactants, II Farmaco (2000), 55, 583-589, Elsevier Science S.A.

Otari et al., Hybrid and gemini surfactants as tools to paint chemists, Paintindia (2000), 50(2), 33-36, 38-42. Colour Publications Pvt. Ltd. Abstract.

Product Information, Silicone Adjuvants for Agriculture, Dow Corning® Q2-5211 Superwetting Agent, Dow Corning Corporation 2001.

* cited by examiner

FLUOROSURFACTANT WITH DISPROPORTIONATE EFFECT

FIELD OF THE INVENTION

This invention relates to surfactant compositions comprising a fluorosurfactant and a siloxane surfactant wherein the fluorosurfactant exhibits a disproportionate effect upon the resulting surfactant composition's ability to lower equilibrium surface tension.

BACKGROUND OF THE INVENTION

Surfactants lower the surface tension of a liquid thereby imparting improved surface effects such as spreading, wettability, penetrability, foam inhibition and dispersibility. These improved surface effects are advantageous in many industrial applications including aqueous coatings such as inks, paints, varnishes, and the like.

Equilibrium surface tension refers to the surface tension measured after the liquid and added surfactant have reached equilibrium. Liquids with poor (high) equilibrium surface tension may initially spread smoothly and evenly across a surface but after some time will "de-wet" resulting in undesirable surface defects. This occurs because the passage of time allows the liquid and added surfactant to reach an equilibrium surface tension which is undesirably high thereby causing a liquid which was initially smooth and evenly spread to "crawl back" or "retract" from the surface thereby creating an uneven and rippled spreading. Poor equilibrium surface tension is particularly detrimental in paints which are expected to dry as a smooth and even coating.

Two common surfactants, used to lower equilibrium surface tension, are fluorosurfactants and siloxane surfactants. In general, fluorosurfactants impart significantly lower equilibrium surface tensions compared with siloxane surfactants. However, because fluorosurfactants are typically higher in cost compared with siloxane surfactants, fluorosurfactants are often mixed with less expensive siloxane surfactants to produce surfactant compositions which adequately lower equilibrium surface tension at lower cost. For example, U.S. Pat. No. 5,852,075 discloses a surfactant composition comprising a fluorosurfactant and a siloxane surfactant. Although it would be desirable from a cost perspective to use lower amounts of fluorosurfactant, U.S. Pat. No. 5,852,075, as well as many other relevant documents, lacks any specific teaching of surfactant compositions comprising a fluorosurfactant and a siloxane surfactant wherein the fluorosurfactant is present in an amount less than 22 weight percent.

A teaching of fluorosurfactant in lower amounts is absent perhaps because of an expectation that surfactant compositions comprising amounts lower that 22 weight percent of fluorosurfactant would not adequately lower equilibrium surface tension. The expectation is that decreasing the amount of fluorosurfactant mixed with siloxane surfactant would lead to a proportionate decrease in the resulting surfactant composition's ability to lower equilibrium surface tension. Accordingly, it would be advantageous to identify specific fluorosurfactants and siloxane surfactants that combine to produce surfactant compositions which adequately lower equilibrium surface tension wherein the amount of fluorosurfactant in the surfactant composition is less than 22 weight percent.

BRIEF SUMMARY OF THE INVENTION

The present invention identifies specific fluorosurfactants and siloxane surfactants that combine to produce surfactant compositions which adequately lower equilibrium surface tension wherein the amount of fluorosurfactant in the surfactant composition is no more than 21 weight percent.

The fluorosurfactants and siloxane surfactants identified by the present invention exhibit a desirable disproportionate effect from the fluorosurfactant acting upon the resulting surfactant composition's ability to lower equilibrium surface tension. Because of this disproportionate effect, surfactant compositions of the present invention with no more than 21 weight percent fluorosurfactant have nearly identical ability to lower equilibrium surface tensions compared with surfactant compositions having higher amounts of fluorosurfactant. Such a disproportionate effect is desirable because it permits the use of lower amounts of the more costly fluorosurfactant and higher amounts of the less costly siloxane without significantly deteriorating equilibrium surface tension.

The fluorosurfactant which imparts a desirable disportionate effect upon equilibrium surface tension when used in conjunction with a siloxane in the present invention is represented by the following formula:

$$R_fC_nH_{2n}QC_mH_{2m}(C_2H_4O)_lR \qquad \text{Formula 1}$$

wherein
n=1, 2, 4, 6;
m=0 to about 12;
l=5 about 15;
$R_f$ is $C_nF_{2n+1}$; $(CF_3)_2CFOC_2F_4$—; $C_3F_7O[CF(CF_3)CF_2O]_k CF_2$—; $C_3F_7O[CF(CF_3)CF_2O]_k CF_2C(O)O$—; or $C_3F_7O[CF(CF_3)CF_2O]_k CF_2CONH$—;
k is 5 to 10;
Q is arylene, O, S, SO, $SO_2$;
R is H, $CH_3$, $C_2H_5$, or $C(O)CH_3$.

The siloxane used in conjunction with the fluorosurfactant of the present invention is represented by the general formulae 2A, 2B, 2C, or 3 as follows:

$$(R^2)_3SiO[Si(R^2)_2O]_y[Si(R^2)(R^1)O]_x[Si(R^2)_2O]_zSi(R^2)_3 \qquad \text{Formula 2A}$$

$$(R^2)_3SiO[Si(R^2)_2O]_xSi(R^2)_2R^1 \qquad \text{Formula 2B}$$

$$R^1(R^2)_2SiO[Si(R^2)_2O]_xSi(R^2)_2R^1 \qquad \text{Formula 2C}$$

Formula 3 wherein
each $R^2$ is independently H, alkyl, or aryl;
each $R^1$ is a polyoxyalkylene group having the formula 4 as follows:

$$-C_nR^4_pH_{2n-p}QC_mR^5_pH_{2m-p}OZR^3 \qquad \text{Formula 4}$$

wherein
each $R^4$ and $R^5$ is independently H, alkyl, or aryl;
Q is $C_nHR^4$, aryl, $CH_2CH(OR^4)$, $CH_2(CH_2OR^4)$, S, O, SO, $SO_2$, $SO_2NR^4$, OC(O), OC($NR^4$), NHC(X)NH, or OC(X)NH or triazole;
Z is $[C_2H_4O]_a$ and $[C_3H_6O]_b$ in block or random order;
X is O or S;
m and n are each independently an integer of 2 to 8;

a is an integer of 0 to about 30; b is an integer of 0 to about 20; provided that a+b is from 1 to about 50;

each $R^3$ is H, acyl, or a linear or branched alkyl or aryl group having 1 to about 20 carbon atoms;

w is an integer of 1 to 3;

x is an integer of from 1 to about 20;

y is an integer of from 0 to about 20; and z is an integer of from 0 to about 10.

Preferably $R^2$ is H, $CH_3$, $C_2H_5$, or $C_6H_5$; more preferably H or $CH_3$; and most preferably $CH_3$. In a particularly preferable embodiment of the invention, each $R^1$ is a polyoxyalkylene group having the Formula 4 where p is 1, Q is O, m is 2, $R^5$ is H, a is 7, b is 0, and $R^3$ is H.

The present invention includes a surfactant composition comprising a mixture of the aforementioned fluorosurfactant and siloxane surfactant wherein the fluorosurfactant is present in an amount no more than 21 weight percent, or no more than 18 weight percent, or no more than 10 weight percent. In addition to a blend of individual components, the term "mixture" is also intended to include any product which may result from the reaction or other interaction of the individual components.

The present invention also includes a surfactant composition consisting essentially of the aforementioned fluorosurfactant and siloxane and preferably having no other ingredient in excess of 10 weight percent.

The present invention also contemplates an aqueous solution, dispersion, or emulsion comprising between 0.01 to 2.0 weight percent of the aforementioned surfactant compositions and optionally having lower amounts such as between 0.01 to 1.0 weight percent, or between 0.01 and 0.1 weight percent.

BRIEF DESCRIPTION OF THE DRAWING(S)

As described further herein.

DETAILED DESCRIPTION OF THE INVENTION

The present invention identifies specific fluorosurfactants and siloxane surfactants that combine to produce surfactant compositions which adequately lower equilibrium surface tension wherein the amount of fluorosurfactant in the surfactant composition is no more than 21 weight percent.

The fluorosurfactant which imparts a desirable disportionate effect when use in conjunction with a siloxane in the present invention is represented by the following formula:

$$R_fC_nH_{2n}QC_mH2_m(C_2H_4O)_lR \qquad \text{Formula 1}$$

wherein n=1, 2, 4, 6;

m=0 to about 12;

l=5 about 15;

$R_f$ is $C_nF_{2n+1}$; $(CF_3)_2CFOC_2F_4$—; $C_3F_7O[CF(CF_3)CF_2O]_k$ $CF_2$—; $C_3F_7O[CF(CF_3)CF_2O]_kCF_2C(O)O$—; or $C_3F_7O[CF(CF_3)CF_2O]kCF_2CONH$—;

k is 5 to 10;

Q is arylene, O, S, SO, $SO_2$;

R is H, $CH_3$, $C_2H_5$, or $C(O)CH_3$.

The compounds of Formula 1 when Q is O are prepared by conventional methods by reacting a fluorinated alcohol or fluorinated alcohol mixture with ethylene oxide in the presence of a catalyst. The catalyst is typically a mixed system comprising an alkali metal borohydride in combination with a source of iodine selected from elemental iodine, alkali metal iodide, or an alkaline earth metal iodide. Further details of such reactions are in U.S. Pat. No. 5,567,857 herein incorporated by reference.

The Q containing species are synthesized starting with partially fluorinated thiols or thioethers such as $R_fC_nH_{2n}SH$ and $R_fC_nH_{2n}S$ $C_mH_{2m}OH$, respectively. The synthesis of these and related species containing telomer $C_nF_{2n+1}$ as the fluorinated portion are taught in U.S. Pat. Nos. 2,642,416; 3,102,103; 3,282,905; 3,544,663; 3,655,732A; 3,773,826A; 3,786,089A; 3,808,251A; 4,302,366; 4,266,080; and 4,310,698. Their ethoxylation can be achieved using the same method applied for the telomer alcohols. In addition, thiols can be reacted with—halide, tosylate, or triflate terminated polyoxyalkylene via nucleophilic substitution reactions in a basic medium.

The siloxane used in conjunction with the fluorosurfactant in the present invention is represented by the general formulae 2A, 2B, 2C, or 3 as follows:

$(R^2)_3SiO[Si(R^2)_2O]_y[Si(R^2)(R^1)O]_x[Si(R^2)_2O]_zSi(R^2)_3$     Formula 2A $(R^2)_3SiO[Si(R^2)_2O]_xSi(R^2)_2R^1$     Formula 2B $R^1(R^2)_2SiO[Si(R^2)_2O]_xSi(R^2)_2R^1$     Formula 2C Formula 3 wherein each $R^2$ is independently H, alkyl, or aryl;

each $R^1$ is a polyoxyalkylene group having the formula 4 as follows:

$—C_nR^4_pH_{2n-p}QC_mR^5_pH_{2m-p}OZR^3$     Formula 4 wherein each $R^4$ and $R^5$ is independently H, alkyl, or aryl;

Q is $C_nHR^4$, aryl, $CH_2CH(OR^4)$, $CH_2(CH_2OR^4)$, S, O, SO, $SO_2$, $SO_2NR^4$, OC(O), OC($NR^4$), NHC(X)NH, or OC(X)NH or triazole;

Z is $[C_2H_4O]_a$ and $[C_3H_6O]_b$ in block or random order;

X is O or S;

m and n are each independently an integer of 2 to 8;

a is an integer of 0 to about 30; b is an integer of 0 to about 20; provided that a+b is from 1 to about 50;

each $R^3$ is H, acyl, or a linear or branched alkyl or aryl group having 1 to about 20 carbon atoms;

w is an integer of 1 to 3;

x is an integer of from 1 to about 20;

y is an integer of from 0 to about 20; and z is an integer of from 0 to about 10.

Preferably $R^2$ is H, $CH_3$, $C_2H_5$, or $C_6H_5$; more preferably H or $CH_3$; and most preferably $CH_3$. In a particularly preferable embodiment of the invention, each $R^1$ is a polyoxyalkylene group having the Formula 4 where p is 1, Q is O, m is 2, $R^5$ is H, a is 7, b is 0, and $R^3$ is H.

Many of siloxane surfactants suitable for use in the invention are commercially available including Q2-5211 available from Dow Corning Corporation, Midland, Mich.; and SIL- WET L7608 available from available from GE Silicones General Electric Company, Wilton, Conn.

The compounds of Formula 2A, 2B, 2C, and 3 may be prepared as follows. The Q-containing species are synthesized according to common published procedures. A summary of these organic transformation reactions can be found in "Comprehensive Organic Transformations" by Richard C. Larock, Wiley-VCH, New York, N.Y., $2^{nd}$ Edition, 1999.

Generally the attachment of ω-functionalized alkyl groups to the siloxane is accomplished via hydrosilylation of the corresponding ω-functionalized olefin with a silane moiety containing siloxane. In parallel, the polyoxyalkylenes are terminated with ω-functionalized alkylenes via the reaction of the polyoxyalkylene alkoxides with ω-functionalized α-halides and tosylates, respectively, via nucleophilic substitution reactions. If ω-functionalized alkylenes are pre-reacted with ω-functionalized alpha-halides and tosylates, respectively, via their ω-positioned functions, the resulting α-halides/tosylates-ω-olefine intermediates can be reacted further with the polyoxyalkylene alkoxides and, in turn, the desired siloxane surfactant is obtained upon hydrosilylation of the olefin terminated Q-containing polyoxyalkylene species with a silane containing siloxane. Specifically, $C_nHR^4$ and arylene containing linker are obtained using the corresponding olefins terminated polyalkyleneoxide precursors.

Derivatives containing $CH_2CH(OR^4)$ and $CH_2(CH_2OR^4)$ are furnished by reaction of a glycidyl terminated polyalkylene glycols with ω-hydroxylalkyl substituted siloxanes or glycidyl terminated siloxane with ω-hydroxylalkyl substituted polyalkylene glycols under acid and basic reaction conditions, respectively, optionally followed by alkylation.

The surfactant compositions of the present invention comprise the fluorosurfactants and the siloxane surfactants described herein. The amount of fluorosurfactant in the surfactant composition of the present invention is no more than 21 weight percent. As shown in the examples that follow, it has been discovered that, because of the desirable disproportionate effect of the fluorosurfactant, no more than 21 weight percent of the fluorosurfactant is required to adequately lower equilibrium surface tension. It has further been discovered that amounts of fluorosurfactant much lower than 21 weight percent can adequately lower surface tension. For example, the surfactant compositions of the present invention can have an amount of fluorosurfactant of no more than 18 weight percent, or no more than 15 weight percent, or no more than 10 weight percent.

The amount of siloxane surfactant in the surfactant compositions of the present invention depends upon the desired amount of fluorosurfactant therein. Because the surfactant compositions of the present invention do not comprise more than 21 weight percent of fluorosurfactant, the surfactant compositions can comprise up to 79 weight percent of the siloxane surfactant. It is preferable that the surfactant compositions of the present invention are essentially comprised of a mixture of the fluorosurfactant and siloxane surfactant described herein. Even more preferably, the surfactant compositions of the present invention are essentially comprised of the fluorosurfactant and siloxane surfactant described herein such that preferably no more than 10 weight percent of any other ingredient is present, more preferably no more than 5 weight percent of any other ingredient is present, and even more preferably no more than 1 weight percent of any other ingredient is present, and most preferably no more than 0 weight percent of any other ingredient is present.

Figure 1:
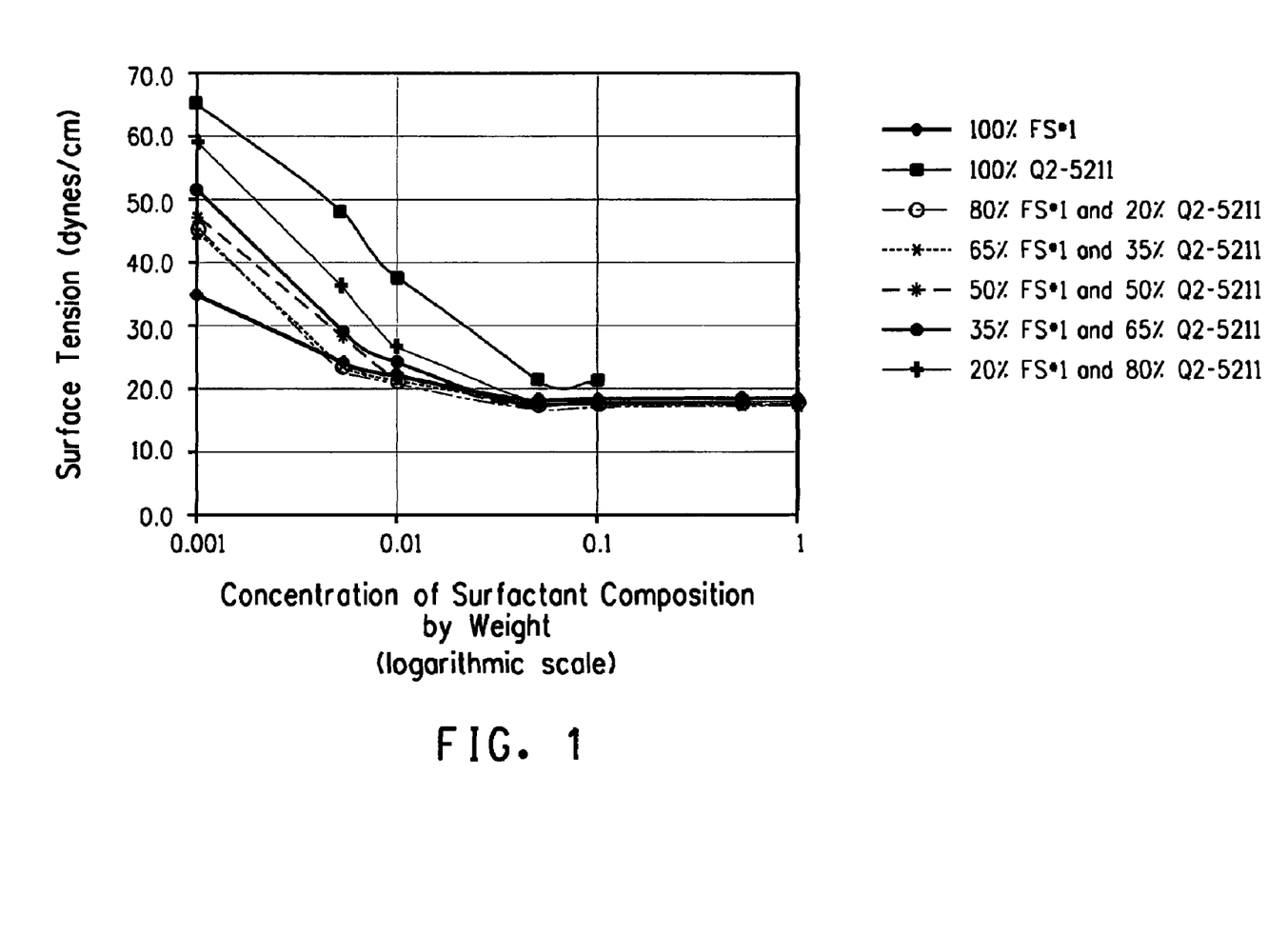
FIGS. 1, 2, and 3 are graphical representations of concentration versus surface tension for surfactant compositions of the present invention as well as comparative surfactant compositions.
Figure 2:
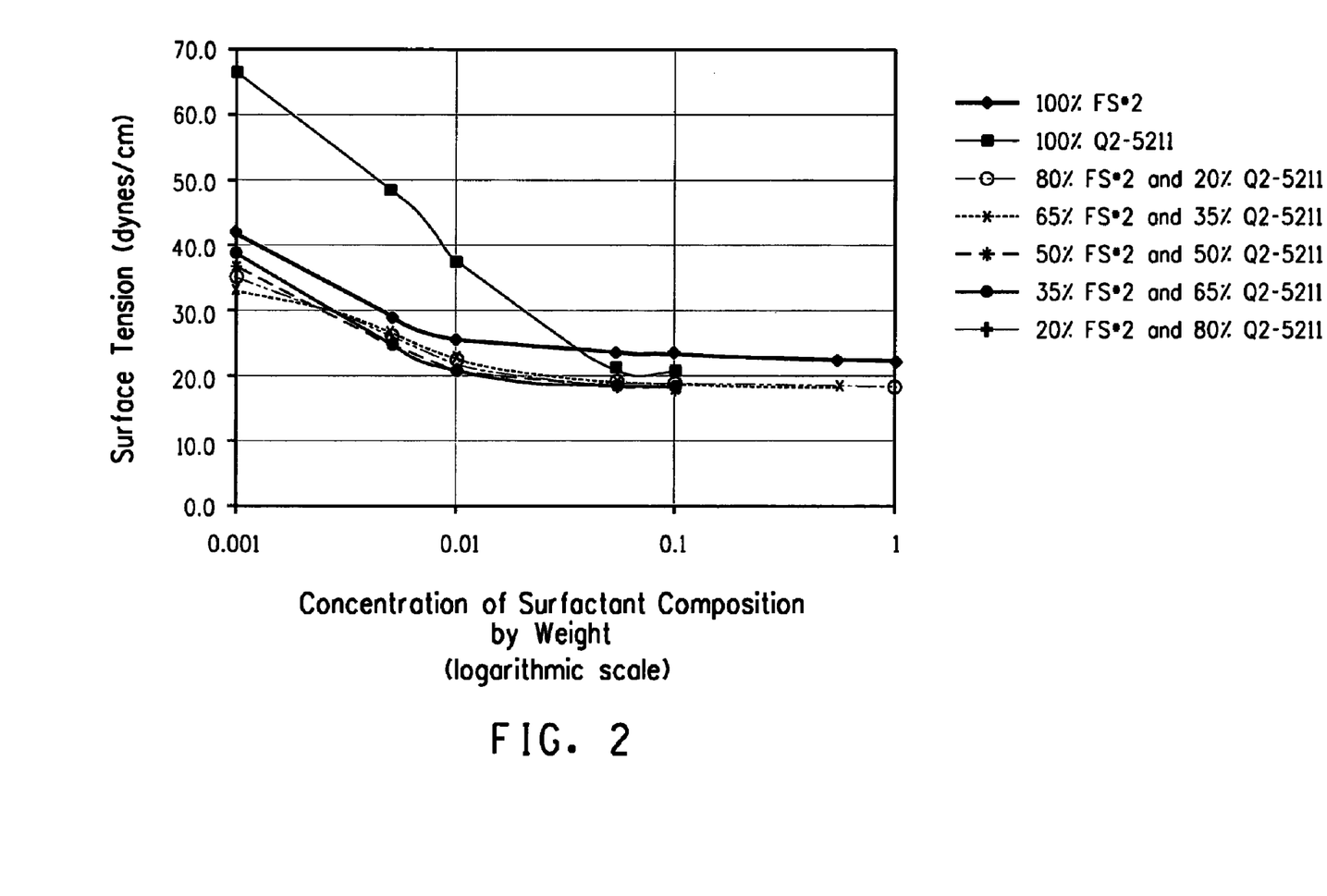
Figure 3:
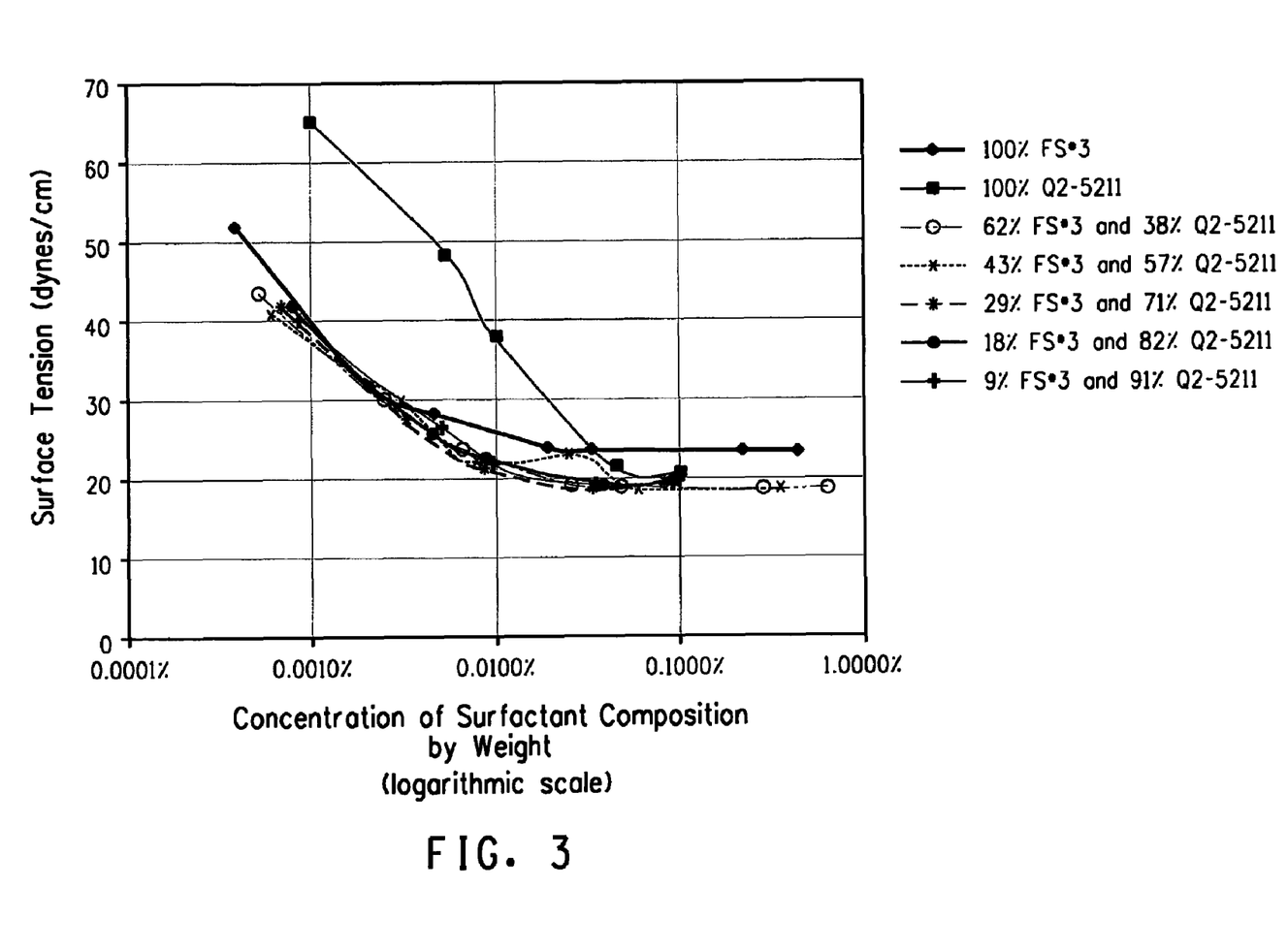

The surfactant compositions of the present invention can be added to virtually any liquid to reduce the surface tension thereof. The surfactant compositions of the present invention are particularly suited for use in aqueous solution, dispersions, or emulsions. Because of the disproportionate effect of the fluorosurfactant, only small amounts of the surfactant composition of the present invention are required to adequately lower surface tension. For example, the amount of surfactant composition of the invention added can be as low as 2 weight percent based on the weight of the liquid. As shown by FIGS. 1, 2, and 3, the amount of surfactant composition added can be as low as 1, 0.1, or even 0.01 weight percent based on the weight of the liquid.

EXAMPLES

Fluorosurfactants

For all of the examples below, the following fluorosurfactants were used. FS#1, FS#2, and FS#3 are all different ethoxylated nonionic fluorosurfactants prepared as described in U.S. Pat. No. 5,567,857, and available from E.I. du Pont de Nemours and Company, Wilmington, Del. FS#1, FS#2 and FS#3 have an average number of ethoxy groups of about 7, 10, and 12 respectively.

Siloxane Surfactant

For all of the examples below, the siloxane surfactant used was a trisiloxane ethoxylate and commercially available as Q2-5211 from Dow Corning Corporation. Midland, Mich.

Surface Tension Measurements

In examples 1-4, equilibrium surface tension was measured in accordance with the following procedure. An aliquot (30 mL) of each aqueous solution was poured into separate glass dishes and allowed to equilibrate for 20-30 seconds before measurements were taken. The measurements were provided using a Krüss K11 tensiometer (available from Krüss GmbH, Hamburg, Germany) using the 'Wilhelmy Plate Method' wherein a small platinum plate with a roughened surface is suspended perpendicular to the liquid surface contained in the glass dish. The plate is attached to a force measuring balance. The glass dish is raised manually until the surface of the liquid is a few millimeters in distance from the suspended plate. The dish is then raised electronically and the wetting of the plate provides for a force proportional to the surface tension of the liquid. A mean surface tension value was obtained from ten consecutive readings and reported in units of dyne/cm where 1 dyne/cm is equivalent to 1 mN/M. A mean equilibrium surface tension value for each dilution is shown herein on column 2 of Table 1 and on column 3 of Tables 2, 3, and 4. In certain cases, marked by an asterisk (*) on the tables, it was not possible to obtain a surface tension measurement because a homogenous solution was not achieved.

Example 1

Comparative

In this comparative example, a surfactant composition was made with no fluorosurfactant and made only with siloxane surfactant, specifically Q2-5211. Aqueous solution of Q2-5211 dissolved in weight percents listed on column 1 of Table 1 were prepared and stirred for a period of 18-24 hours. Equilibrium surface tension measurements were taken of each of the aqueous solution and are shown on column 2 of Table 1. A graphical representation of concentration versus equilibrium surface tension of these aqueous solutions is depicted as square shapes in FIGS. 1, 2, and 3.

TABLE 1

| Concentration of Q2-5211 by weight | Surface Tension (dyne/cm) |
| --- | --- |
| 1 | * |
| 0.5 | * |
| 0.1 | 20.6 |
| 0.05 | 21.0 |
| 0.01 | 37.1 |
| 0.005 | 48.6 |
| 0.001 | 65.3 |

Example 2

In this example, six surfactant compositions ranging from 100 to 20 weight percent of FS#1 (fluorosurfactant) and from 0 to 80 weight percent Q2-5211 were made and are listed in column 1 of Table 2. Seven aqueous solutions of each surfactant composition in decreasing concentrations were prepared and stirred for a period of 18-24 hours. The amount by weight percent of the surfactant composition in aqueous solution is shown on column 2 of Table 2. Equilibrium surface tension measurements were taken of each of the aqueous solution and are shown on column 3 of Table 2. A graphical representation of concentration versus equilibrium surface tension of each of the six surfactant compositions is depicted in FIG. 1.

As generally shown by FIG. 1, a surfactant composition comprising 100 weight percent FS#1 (fluorosurfactant) yields the lowest surface tension while 100 weight percent Q2-5211 (siloxane surfactant) yields the highest surface tension. However, FIG. 1 also unexpectedly shows that surfactant compositions having as little as 20 weight percent FS#1 yield significantly low surface tension. As the concentration of the surfactant composition approaches 1 weight percent, FIG. 1 surprisingly shows that surfactant compositions having as little as 20 weight percent FS#1 yield virtually identical results as surfactant compositions having much higher amounts of FS#1.

TABLE 2

| Surfactant Composition by Weight | Concentration of Surfactant Composition by Weight | Surface Tension (dyne/cm) |
| --- | --- | --- |
| 100% FS#1 | 1 | 17.8 |
|  | 0.5 | 17.9 |
|  | 0.1 | 17.9 |
|  | 0.05 | 18.2 |
|  | 0.01 | 21.2 |
|  | 0.005 | 24.6 |
|  | 0.001 | 34.5 |
| 80% FS#1 | 1 | 16.8 |
| 20% Q2-5211 | 0.5 | 17.0 |
|  | 0.1 | 17.3 |
|  | 0.05 | 17.5 |
|  | 0.01 | 20.8 |
|  | 0.005 | 24.7 |
|  | 0.001 | 44.8 |
| 65% FS#1 | 1 | 17.1 |
| 35% Q2-5211 | 0.5 | 17.2 |
|  | 0.1 | 17.3 |
|  | 0.05 | 17.3 |
|  | 0.01 | 22.0 |
|  | 0.005 | 25.4 |
|  | 0.001 | 44.4 |
| 50% FS#1 | 1 | N/A |
| 50% Q2-5211 | 0.5 | 17.4 |
|  | 0.1 | 17.6 |
|  | 0.05 | 17.6 |
|  | 0.01 | 21.8 |
|  | 0.005 | 28.5 |
|  | 0.001 | 46.4 |
| 35% FS#1 | 1 | N/A |
| 65% Q2-5211 | 0.5 | 17.9 |
|  | 0.1 | 18.0 |
|  | 0.05 | 17.6 |
|  | 0.01 | 23.4 |
|  | 0.005 | 29.1 |
|  | 0.001 | 51.3 |
| 20% FS#1 | 1 | N/A |
| 80% Q2-5211 | 0.5 | N/A |
|  | 0.1 | 18.2 |
|  | 0.05 | 18.4 |
|  | 0.01 | 26.3 |
|  | 0.005 | 35.7 |
|  | 0.001 | 59.3 |

Example 3

In this example, six surfactant compositions ranging from 100 to 20 weight percent of FS#1 (fluorosurfactant) and from 0 to 80 weight percent Q2-5211 were made and are listed in column 1 of Table 3. Seven aqueous solutions of each surfactant composition in decreasing concentrations were prepared and stirred for a period of 18-24 hours. The amount by weight percent of the surfactant composition in aqueous solution is shown on column 2 of Table 3. Equilibrium surface tension measurements were taken of each of the aqueous solution and are shown on column 3 of Table 3. A graphical representation of concentration versus equilibrium surface tension of each of the six surfactant compositions is depicted in FIG. 2.

As generally shown by FIG. 2, a surfactant composition comprising 100 weight percent FS#2 (fluorosurfactant) yields the lowest surface tension while 100 weight percent Q2-5211 (siloxane surfactant) yields the highest surface tension. However, FIG. 2 also unexpectedly shows that surfactant compositions having as little as 20 weight percent FS#2 yields virtually identical results as surfactant compositions having much higher amounts of FS#2.

TABLE 3

| Surfactant Composition by Weight | Concentration of Surfactant Composition by Weight | Surface Tension (dyne/cm) |
| --- | --- | --- |
| 100% FS#2 | 1 | 22.1 |
|  | 0.5 | 22.4 |
|  | 0.1 | 23.3 |
|  | 0.05 | 23.3 |
|  | 0.01 | 25.6 |
|  | 0.005 | 28.4 |
|  | 0.001 | 42.1 |
| 80% FS#2 | 1 | 18.5 |
| 20% Q2-5211 | 0.5 | 18.6 |
|  | 0.1 | 19.1 |
|  | 0.05 | 19.4 |
|  | 0.01 | 22.5 |
|  | 0.005 | 26.5 |
|  | 0.001 | 35.2 |
| 65% FS#2 | 1 | N/A |
| 35% Q2-5211 | 0.5 | 18.6 |
|  | 0.1 | 18.8 |
|  | 0.05 | 18.6 |
|  | 0.01 | 22.0 |
|  | 0.005 | 25.9 |
|  | 0.001 | 37.0 |
| 50% FS#2 | 1 | N/A |
| 50% Q2-5211 | 0.5 | N/A |
|  | 0.1 | 18.8 |
|  | 0.05 | 18.6 |
|  | 0.01 | 20.9 |

TABLE 3-continued

| Surfactant Composition by Weight | Concentration of Surfactant Composition by Weight | Surface Tension (dyne/cm) |
|---|---|---|
|  | 0.005 | 24.6 |
|  | 0.001 | 36.9 |
| 35% FS#2 | 1 | N/A |
| 65% Q2-5211 | 0.5 | N/A |
|  | 0.1 | 19.0 |
|  | 0.05 | 18.7 |
|  | 0.01 | 20.9 |
|  | 0.005 | 25.0 |
|  | 0.001 | 39.0 |
| 20% FS#2 | 1 | N/A |
| 80% Q2-5211 | 0.5 | N/A |
|  | 0.1 | 19.3 |
|  | 0.05 | 19.3 |
|  | 0.01 | 21.4 |
|  | 0.005 | 24.9 |
|  | 0.001 | 38.9 |

Example 4

In this example, six surfactant compositions ranging from 100 to 9 weight percent of FS#3 (fluorosurfactant) and from 0 to 91 weight percent Q2-5211 (siloxane surfactant) were made and are listed in column 1 of Table 5. Seven aqueous solutions of each surfactant composition in decreasing concentrations were prepared and stirred for a period of 18-24 hours. The amount by weight percent of the surfactant composition in aqueous solution is shown on column 2 of Table 5. Equilibrium surface tension measurements were taken of each of the aqueous solution and are shown on column 3 of Table 5. A graphical representation of concentration versus equilibrium surface tension of each of the six surfactant compositions is depicted in FIG. 3.

As generally shown by FIG. 3, a surfactant composition comprising 100 weight percent FS#3 (fluorosurfactant) yields the lowest surface tension while 100 weight percent Q2-5211 (a siloxane surfactant) yields the highest surface tension. However, FIG. 3 also unexpectedly shows that surfactant compositions having as little as 18 weight percent FS#3 yields virtually identical results as surfactant compositions having much higher amounts of FS#3.

TABLE 5

| Surfactant Composition by Weight | Concentration of Surfactant Composition by Weight | Surface Tension (dyne/cm) |
|---|---|---|
| 100% FS#3 | 1 | 22.8 |
|  | 0.5 | 22.8 |
|  | 0.1 | 22.9 |
|  | 0.05 | 23.6 |
|  | 0.01 | 28.3 |
|  | 0.005 | 32.3 |
|  | 0.001 | 51.4 |
| 62% FS#3 | 1 | 18.6 |
| 38% Q2-5211 | 0.5 | 18.6 |
|  | 0.1 | 18.9 |
|  | 0.05 | 19.3 |
|  | 0.01 | 24.1 |
|  | 0.005 | 29.7 |
|  | 0.001 | 43.2 |
| 43% FS#3 | 1 | N/A |
| 57% Q2-5211 | 0.5 | 18.7 |
|  | 0.1 | 18.7 |
|  | 0.05 | 22.6 |
|  | 0.01 | 22.9 |
|  | 0.005 | 29.4 |
|  | 0.001 | 40.7 |

TABLE 5-continued

| Surfactant Composition by Weight | Concentration of Surfactant Composition by Weight | Surface Tension (dyne/cm) |
|---|---|---|
| 29% FS#3 | 1 | N/A |
| 71% Q2-5211 | 0.5 | N/A |
|  | 0.1 | 19.1 |
|  | 0.05 | 19.1 |
|  | 0.01 | 21.4 |
|  | 0.005 | 26.6 |
|  | 0.001 | 41.4 |
| 18% FS#3 | 1 | N/A |
| 82% Q2-5211 | 0.5 | N/A |
|  | 0.1 | 19.3 |
|  | 0.05 | 19.4 |
|  | 0.01 | 22.8 |
|  | 0.005 | 26.3 |
|  | 0.001 | 41.3 |
| 9% FS#3 | 1 | N/A |
| 91% Q2-5211 | 0.5 | N/A |
|  | 0.1 | 19.7 |
|  | 0.05 | 19.7 |
|  | 0.01 | 22.3 |
|  | 0.005 | 26.8 |
|  | 0.001 | 39.8 |

What is claimed is:

1. A surfactant composition comprising a mixture of fluorosurfactant and a siloxane wherein:
   a) the mixture comprises no more than 21 weight percent of the fluorosurfactant and the fluorosurfactant is of the Formula 1

$$R_fC_nH_{2n}QC_mH_{2m}(C_2H_4O)_lR \qquad \text{Formula 1}$$

wherein
   n=1, 2, 4, 6;
   m=0 to about 12;
   l=5 to about 15;
   $R_f$ is $C_nF_{2n+1}$; $(CF_3)_2CFOC_2F_4-$; $C_3F_7O[CF(CF_3)CF_2O]_kCF_2-$; $C_3F_7O[CF(CF_3)CF_2O]_kCF_2C(O)O-$; or $C_3F_7O[CF(CF_3)CF_2O]_kCF_2CONH-$;
   k is 5 to 10;
   Q is arylene, O, S, SO, $SO_2$;
   R is H, $CH_3$, $C_2H_5$, or $C(O)CH_3$; and
   b) the siloxane is of Formulae 2A, 2B, 2C or 3

$$(R^2)_3SiO[Si(R^2)_2O]_y[Si(R^2)(R^1)O]_x[Si(R^2)_2O]_zSi(R^2)_3 \qquad \text{Formula 2A}$$

$$(R^2)_3SiO[Si(R^2)_2O]_xSi(R^2)_2R^1 \qquad \text{Formula 2B}$$

$$R^1(R^2)_2SiO[Si(R^2)_2O]_xSi(R^2)_2R^1 \qquad \text{Formula 2C}$$

Formula 3 wherein
   each $R^2$ is independently H, alkyl, or aryl;
   each $R^1$ is a polyoxyalkylene group having the Formula 4 as follows:

$$-C_nR^4_pH_{2n-p}QC_mR^5_pH_{2m-p}OZR^3 \qquad \text{Formula 4}$$

wherein
each $R^4$ and $R^5$ is independently H, alkyl, or aryl;
Q is $C_nHR^4$, aryl, $CH_2CH(OR^4)$, $CH_2(CH_2OR^4)$, S, O, SO, $SO_2$, $SO_2NR^4$, OC(O), OC($NR^4$), NHC(X)NH, or OC(X)NH or triazole;
Z is $[C_2H_4O]_a$ and $[C_3H_6O]_b$ in block or random order;
X is O or S;
m and n are each independently an integer of 2 to 8;
a is an integer of 0 to about 30; b is an integer of 0 to about 20; provided that a+b is from 1 to about 50;
each $R^3$ is H, acyl, or a linear or branched alkyl or aryl group having 1 to about 20 carbon atoms;
w is an integer of 1 to 3;
x is an integer of from 1 to about 20;
y is an integer of from 0 to about 20; and
z is an integer of from 0 to about 10;
provided that no more than 5% by weight of any other ingredient is present.

2. The composition of claim 1 wherein $R^2$ is H, $CH_3$, $C_2H_5$, or $C_6H_5$.

3. The composition of claim 1 wherein $R^1$ is a polyoxyalkylene group having the Formula 4 where p is 1, Q is 0, m is 2, $R^5$ is H, a is 7, b is 0, and $R^3$ is H.

4. The composition of claim 1 comprising no more than 18 weight percent of said fluorosurfactant.

5. The composition of claim 1 comprising no more than 10 weight percent of the fluorosurfactant.

6. The composition of claim 1 consisting essentially of the mixture of fluorosurfactant and siloxane and having no other ingredient in excess of 1 weight percent.

7. An aqueous solution, dispersion, or emulsion comprising between 0.01 and 2.0 weight percent of the composition of claim 1.

8. An aqueous solution, dispersion, or emulsion comprising between 0.01 and 1.0 weight percent of the composition of claim 1.

9. An aqueous solution, dispersion, or emulsion comprising between 0.01 and 0.1 weight percent of the composition of claim 1.

* * * * *